United States Patent [19]

Hurner

[11] Patent Number: 5,135,044
[45] Date of Patent: * Aug. 4, 1992

[54] PROCESS OF HEATING FUEL IN TANK AND UPON WITHDRAWAL

[76] Inventor: Erwin E. Hurner, 920 Belsly Blvd. S., Moorhead, Minn. 56560

[ * ] Notice: The portion of the term of this patent subsequent to Jul. 9, 2008 has been disclaimed.

[21] Appl. No.: 694,006

[22] Filed: Apr. 30, 1991

Related U.S. Application Data

[63] Continuation of Ser. No. 467,887, Jan. 22, 1990, Pat. No. 5,029,634.

[51] Int. Cl.$^5$ .................. F02M 53/00; F02M 31/16; F02N 17/02
[52] U.S. Cl. .......................................... 165/1; 165/47; 165/74; 165/132; 165/142; 165/177; 123/557

[58] Field of Search .................... 123/557, 142.5 R; 165/51, 47, 1, 74, 132, 177, 142, 41

[56] References Cited

U.S. PATENT DOCUMENTS

| | | | |
|---|---|---|---|
| 4,684,786 | 8/1987 | Mann et al. | 123/557 |
| 4,926,830 | 5/1990 | McNelley | 165/51 |
| 4,964,376 | 10/1990 | Veach et al. | 165/51 |

Primary Examiner—John K. Ford
Attorney, Agent, or Firm—Bailey & Hardaway

[57] ABSTRACT

A method for heating fuel by a fuel heater formed from an elongated unitary structure which defines a fuel channel passing through the length thereof and which defines in the bottom thereof a fuel intake. The unitary structure also defines a heating fluid inlet and outlet on one side of the fuel channel which communicate with one another on that one side of the fuel channel.

1 Claim, 3 Drawing Sheets

PROCESS OF HEATING FUEL IN TANK AND UPON WITHDRAWAL

This application is a continuation of application Ser. No. 07/467,887, filed Jan. 22, 1990 now U.S. Pat. No. 5,029,634 filed Sep. 9, 1991.

BACKGROUND OF THE INVENTION

This invention relates generally to the art of heat exchange and more particularly to an apparatus for heating fuel within a fuel tank.

Diesel fuel operated vehicles have proven to be a great boom to transportation because of their ability to operate economically and efficiently; particularly as compared to gasoline operated vehicles. A recurring problem with the operation of diesel fuel powered transportation, however, is the affect of extremely cold temperatures on diesel fuel. In extremes of cold, diesel fuel has a tendency to gel thus making engine operation difficult if not at times impossible. The inventor herein has contributed to devices to alleviate this problem. References are made to U.S. Pat. Nos. 3,929,187 and 4,624,779 and U.S. application Ser. No. 07/309,105 of Feb. 13, 1989.

Several prior art heaters have employed devices which are placed in contact with fuel in the tank for warming the fuel in the tank.

One such device is described in U.S. Pat. No. 4,726,636 to Lucht wherein a heating apparatus is passed into the fuel tank opening and is adapted to fit thereover. An additional apparatus is disclosed in U.S. Pat. No. 4,656,979 to Hoganson wherein an apparatus is placed through an opening in a fuel tank into the fuel and then extends transversely along the bottom of the tank, like a foot, for directly warming the fuel along the bottom of the tank. The above referenced patent to Lucht discloses a similar foot extending transversely within a fuel tank.

U.S. Pat. No. 4,749,960 to Gilbert Wolf discloses an apparatus for intank fuel warming wherein an outlet is partially surrounded by a heating jacket through which a heating fluid is passed. The Wolf patent also discloses a foot type structure.

While these prior art structures have operated somewhat satisfactorily to warm fuel, additional improvements, particularly with regard to intank fuel heaters, are required to render such devices more effective, durable and resistent to vibration and fuel movement.

SUMMARY OF THE INVENTION

It is thus an object of this invention to provide a novel intank fuel heating apparatus.

It is a further object of this invention to provide such an intank fuel heating apparatus which is resistent to vibration and fuel movement.

It is thus a further and more particular object of this invention to provide such an apparatus which is small enough to be placed through a fuel gauge opening of a fuel tank to render unnecessary the placement of an additional opening through a fuel tank.

It is a further and yet more particular object of this invention to provide such an apparatus which has a fuel outlet and heat transfer medium passageway formed from a unitary structure and which actually heats rather than warms fuel as it is removed from the tank.

These as well as other objects are accomplished by an intank fuel heater formed from an elongated unitary structure which defines a fuel channel passing through the length thereof, and which defines in the bottom thereof a fuel intake. The elongated unitary structure defines a heating fluid inlet and outlet both of which extended the length of the elongated unitary structure on one side of the fuel channel and which communicate with each other on that one side of the fuel channel near the fuel intake. Heating fluid in the inlet and outlet heats fuel through the entire length of the fuel channel as well as heating fuel surrounding and beneath the unitary structure.

DETAILED DESCRIPTION

In accordance with this invention it has been found that a unitary structure may be utilized to produce an intank fuel heater having dimensions significantly less than any intank fuel heater previously utilized. Such lesser dimensions permit the apparatus to be mounted in a conventional fuel gauge opening within a fuel tank while simultaneously lessening forces that are applied to that opening due to the smaller size of the apparatus exposed to the fuel. Because it is an unitary structure vibration effects are minimized. Various other advantages and features will become apparent from a reading of the following description given with reference to the various figures of the drawings.

Figure 1:
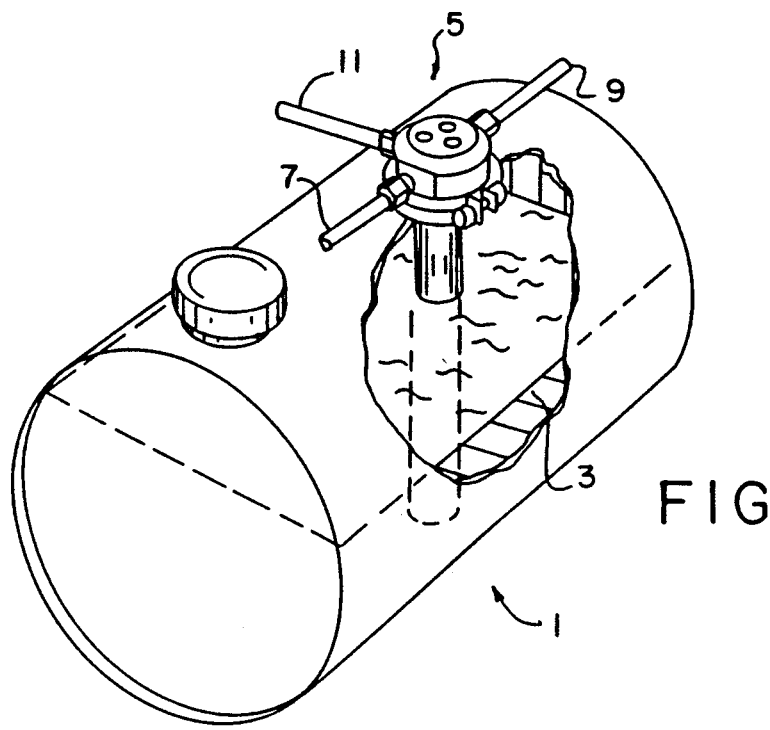
FIG. 1 of the drawings is a partial cutaway perspective view of a fuel tank having the apparatus of this invention mounted therein.

FIG. 1 of the drawings illustrates a fuel tank 1 having fuel 3 therein and the intank fuel heater 5 of this invention mounted therethrough. On the exterior of tank 1 the apparatus 5 of this invention has an opening 7 to communicate with a source of heat transfer medium and an opening 9 to permit exit of that heat transfer medium. The heat transfer medium is preferably the heat transfer medium utilized in a engine, such that the heat from the engine is utilized to heat fuel as it leaves the apparatus 5 through a fuel line 11.

Figure 3:
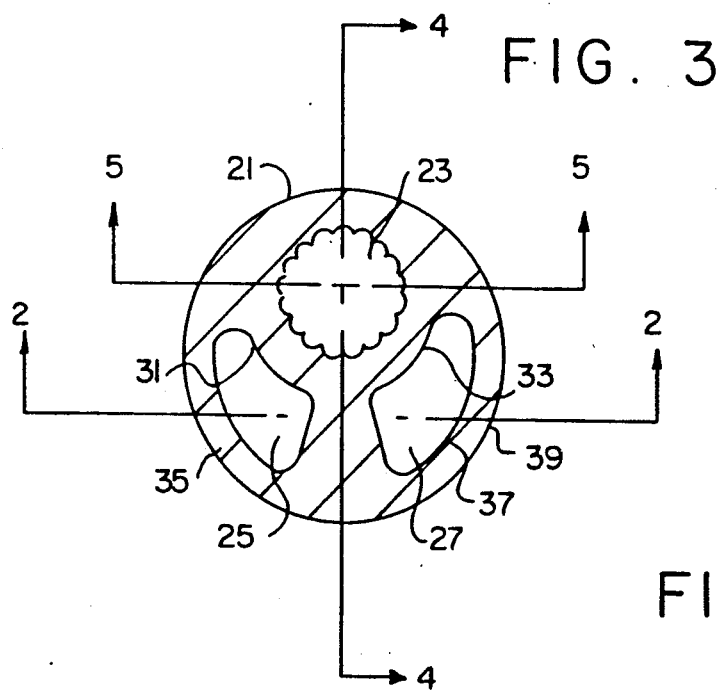
FIG. 3 of the drawings is a cross sectional view along the line 3—3 of FIG. 2.
Figure 2:
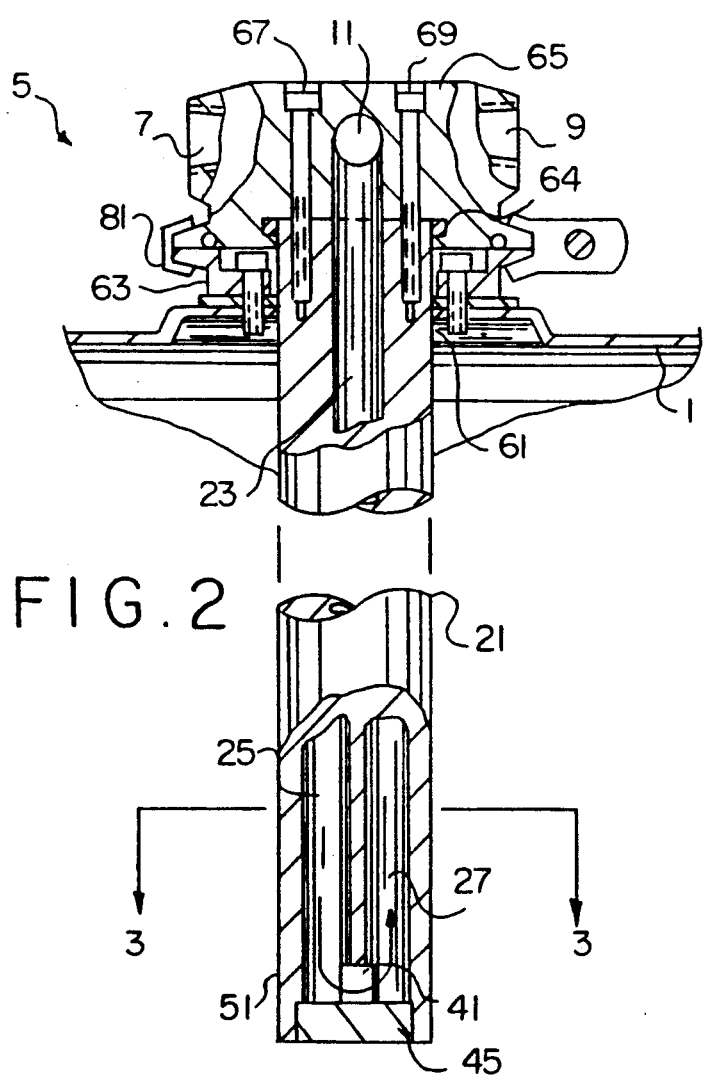
FIG. 2 of the drawings is an enlarged partial cutaway view of the fuel heater of this invention.

FIG. 2 of the drawings is a partial cutaway view of the apparatus 5 of this invention. It is seen that the apparatus 5 is formed of an elongated unitary structure 21 which defines therein a fuel channel 23 which extends the entire length of the elongated unitary structure 21. The heat transfer medium which enters through opening 7 and exits through opening 9 is utilized to heat the fuel which is within the fuel channel 23 by means best illustrated in FIG. 3 which is a cross sectional view along the line 3—3 of FIG. 2. Referring to FIG. 3 it is seen that elongated unitary structure 21 defines on one side of the fuel channel 23 a heat transfer fluid channel inlet 25 and heat transfer medium outlet 27. It is understood that terms "inlet" and "outlet" are for the purpose of reference only since the heat transfer medium can flow in either direction.

It should be noted from FIG. 3 that inlet 25 and outlet 27 are located on one side of elongated unitary structure 21, while the fuel channel 23 is located on an opposite side of structure 21. This arrangement permits the overall diameter of the unitary structure 21 to be maintained at a minimum and permits heat transfer to occur effectively within a small space. It is seen that inlet 25 and outlet 27 are largely kidney shaped with the interior kidney surface 31 and 33 focused toward fuel channel 23 and the outer kidney surface 35 and 37 focused toward outer surface 39 of elongated unitary structure 21.

Fuel channel 23 itself has a serrated fin surface to provide a large heat transfer surface within the fuel channel 23. Elongated structure 21 with its various openings therethrough is preferably formed by a metallic extrusion process and preferably formed of a metallic material having high heat transfer coefficients such as aluminum and aluminum alloys.

Figure 4:
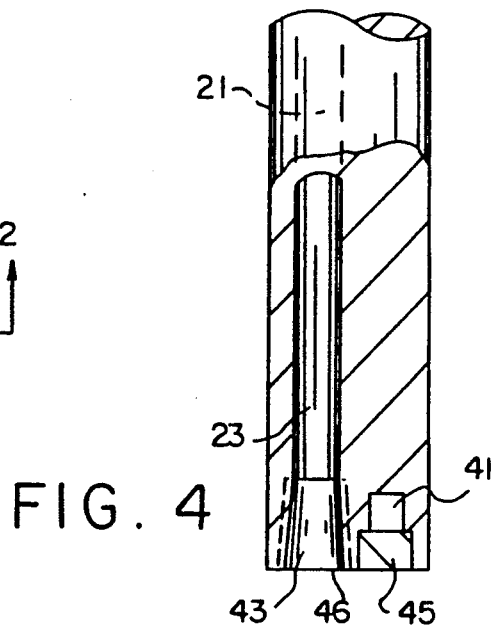
FIG. 4 is a cross sectional view along the line 4—4 of FIG. 3.

Inlet 25 and outlet 27 communicate with one another through a passageway 41, best illustrated in FIGS. 2 and 4. Passageway 41 is located near fuel intake opening 43 of fuel channel 23.

Figure 5:
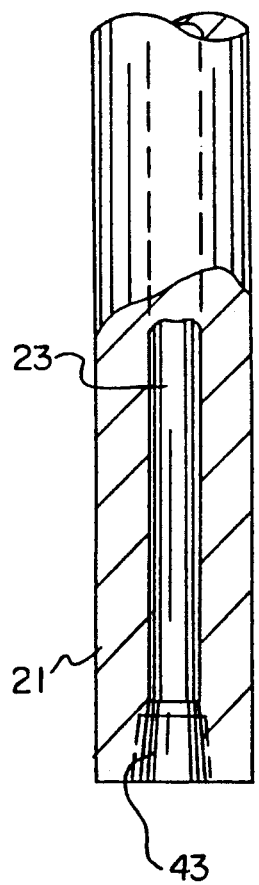
FIG. 5 is a partial cutaway view along the line 5—5 of FIG. 3.

Since unitary structure 21 is an extrusion, channel 41 is preferably machined therein and closed off by a plug structure 45. Fuel intake 43 may be better viewed from FIG. 5 which is a cross sectional view along the line 5—5 of FIG. 3. It is, of course, understood from a view of FIGS. 3, 4, and 5 that heat is provided through the bottom 46 of unitary structure 21 to heat fuel before it enters fuel intake 43. This is in contrast to prior art intank heaters which do not provide heat through the bottom thereof.

Referring to the lower end of FIG. 2 which is a cross section generally along the line 2—2 of FIG. 3, passageway 41 is illustrated as it cooperates with inlet 25 and outlet 27 showing the flow of heat transfer medium by arrow 51 about one side of the elongated unitary structure 21.

It is indeed seen that the apparatus of this invention provides heat to the fuel in fuel channel 23 from the bottom of elongated structure 21 to the top thereof, i.e. from the fuel intake opening 43 to the fuel outlet line 11.

Figure 6:
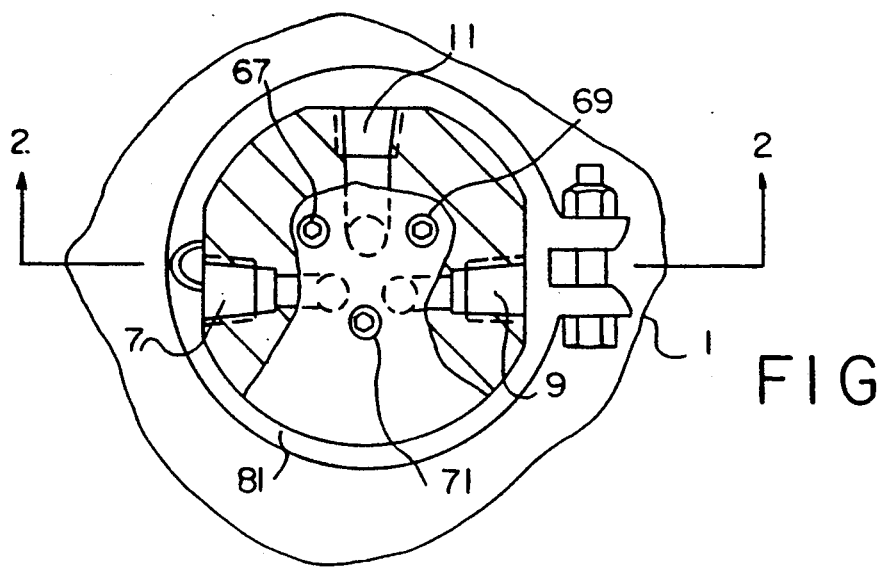
FIG. 6 is a top view of FIG. 2.

Referring to the upper section of FIG. 2, a portion of fuel tank 1 is illustrated as having an opening 61 therein, which is the same size as the standard opening for a fuel gauge. An adapter plate 63 is bolted to the fuel tank through standard openings and is rotatably attached to upper head 65 which is sealed to elongated unitary structure 21 by o-ring 64 and secured thereto by bolts 67 and 69 as well as bolts 71 which are illustrated in the top view of FIG. 6. Clamp ring 81 assists in maintaining the integrity of the mounted structure.

Figure 7:
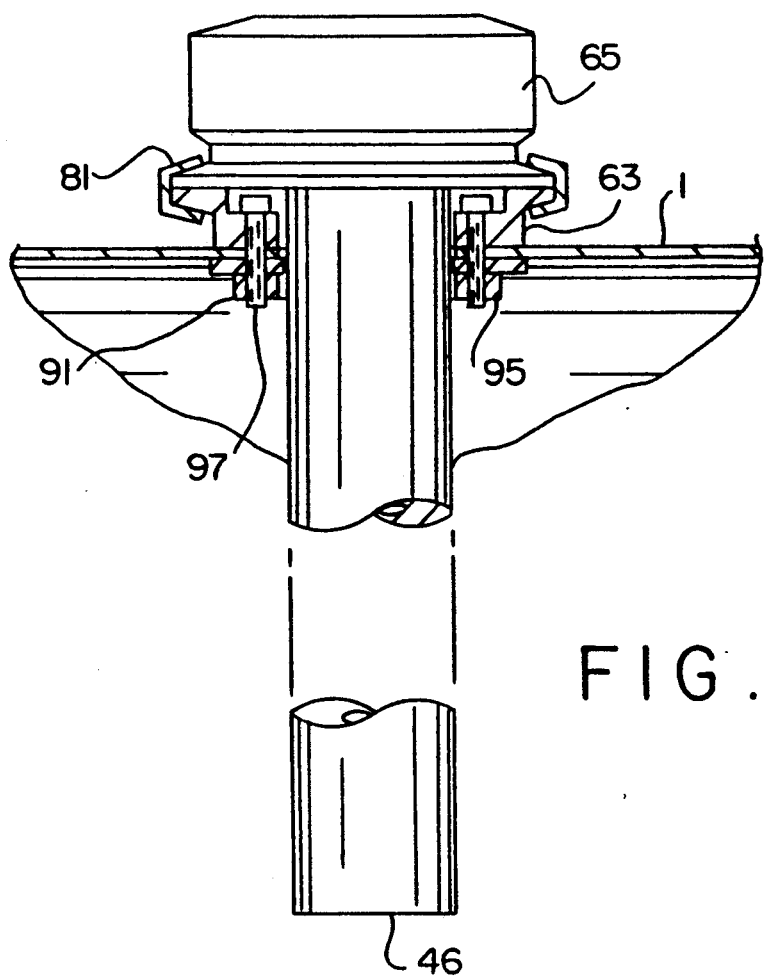
FIG. 7 of the drawings is a cross sectional view similar to FIG. 2 illustrating an additional embodiment of this invention.
Figure 8:
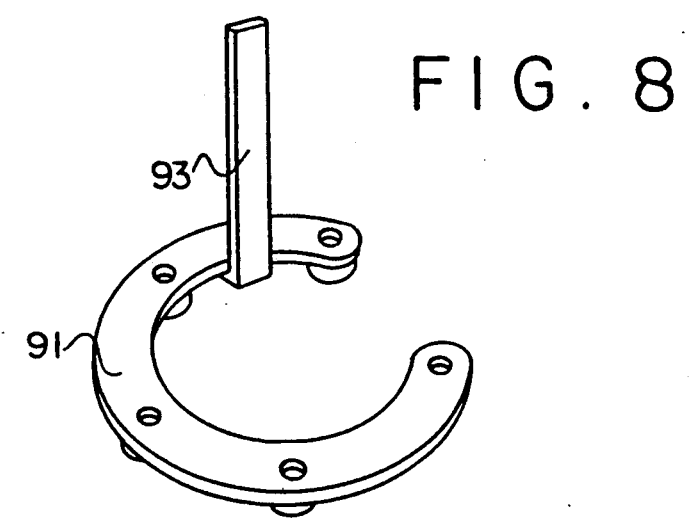
FIG. 8 of the drawings illustrates in a perspective view an adapter plate in accordance with this invention.

An additional embodiment is illustrated in FIG. 7 wherein a fuel tank mounts the apparatus of this invention through an opening the same size and cost but not otherwise adapted for a fuel gauge. In this event the fuel tank 1 has mounted therebelow a lower adaptor plate 91 better seen in FIG. 8. Lower adapter plate 91 is horseshoe shaped with an open end portion to facilitate placement of the lower adapter plate 91 within a fuel tank opening having a diameter the same size as the inner diameter of the horseshoe shaped lower adapter plate 91. Lower adapter plate 91 has a leg 93 temporarily attached thereto to maintain placement within a fuel tank while adapter plate 63 is secured to lower adapter plate 91 by illustrated bolts 95 and 97, as well as others not shown. Leg 93 is loosely secured so to that it can be manually removed after lower adapter plate 91 is secured.

An advantage of the configuration whereby adapter plate 63 is secured to upper head 65 by a clamp 81 so that the mounting is rotatable. Since rotation assures a desired orientation for unitary structure 21, appropriate alignment with fuel line 11 is easily achieved. Upon achieving appropriate orientation clamp 81 is secured and bolts 67, 69 and 71 tightened.

The apparatus of this invention has significant advantages. It is easily installed within a fuel tank of either an original piece of equipment or in the after market because of the bolting arrangement. The bolting arrangement is compatible with that of original equipment fuel gauges as well as including an adapter plate having a similar configuration for independent mounting in the after market. The easy installation of the apparatus of this invention also permits rotatable orientation during the installation process. The apparatus of this invention heats fuel through the entire length of an elongated structure as well as heating the bottom thereof to provide heat to the fuel in the tank. Heat is transmitted from the apparatus of this invention through the entire circumference thereof as well as the entire length.

With this heater in each fuel tank, it is now possible to run dual draw and dual return fuel systems in cold weather, therefore, eliminating cross over hoses, bottom draw and standard draw tubes and therefore eliminating fuel spills on highways from broken cross over lines.

It is thus seen that the apparatus of the invention provides an intank fuel heater which is more resistent to vibration and fuel movement than intank fuel heater devices previously utilized. It is further seen that this invention provides an intank fuel heater of lesser dimensions than those previously provided and which is insertable into a fuel tank through a conventional fuel gauge opening. It is further seen that this invention provides an intank fuel heater formed of a unitary structure. As various modifications will become apparent to those of skill in the art from a reading of the foregoing specification which is exemplary in nature, such modifications are embodied within the spirit and scope of this invention as defined by the following appended claims.

That which is claimed:

1. A process for heating fuel as it is removed from a tank thereof comprising the steps of:
   immersing an elongated structure in said fuel;
   drawing said fuel through an intake of said elongated structure, said elongated structure having a bottom defining said intake and outer walls contacting said fuel said bottom including a generally planar plug structure adjacent the portion thereof defining said intake, said plug structure having an interior surface and an exterior surface coplanar with said intake;
   passing a heating fluid downwardly through said elongated structure adjacent said drawn fuel on the exterior thereof to heat said drawn fuel and heat fuel adjacent said outer walls on the exterior thereof;
   continuing to pass said heating fluid downwardly to said interior surface of said plug structure to heat said plug structure and the exterior surface thereof and thereby heat said fuel immediately adjacent said bottom and near said intake prior to said fuel entering said intake;
reversing the flow of said heat transfer fluid at said interior surface; and
passing said heat transfer fluid upwardly adjacent said drawn fuel whereby said heat transfer fluid heats said fuel along substantially entire length of travel of said fuel through said elongated structure.

* * * * *